United States Patent
Thurston et al.

(10) Patent No.: US 7,146,609 B2
(45) Date of Patent: Dec. 5, 2006

(54) METHOD, SYSTEM AND ARTICLE OF MANUFACTURE FOR A FIRMWARE IMAGE

(75) Inventors: Scott A. Thurston, Westminster, CO (US); David C. Weibel, Longmont, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 748 days.

(21) Appl. No.: 10/151,054

(22) Filed: May 17, 2002

(65) Prior Publication Data

US 2003/0217193 A1 Nov. 20, 2003

(51) Int. Cl.
G06F 9/44 (2006.01)

(52) U.S. Cl. .................. 717/169; 717/170; 717/175

(58) Field of Classification Search ........ 717/168–178; 715/760
See application file for complete search history.

(56) References Cited

U.S. PATENT DOCUMENTS 5,960,189 A * 9/1999 Stupek et al. ............... 717/169
2003/0217358 A1 * 11/2003 Thurston et al. ............ 717/174

OTHER PUBLICATIONS

Green, "What you Installed Is What You See: Help Navigation in Modular Software Products", IEEE, pp. 521-533, 2000.*
ArborText, "W3C XML Specification DTD (?XMLspec?)", http://www.w3.org/XML/1998/06/xmlspec-report-19990205.htm, pp. 1-80, 1999.*
Ensel et al., "XML-based monitoring of services and dependencies", IEEE, pp. 1646-1650, Nov. 2001.*
Steinacker et al., "Metadata Standards for Web-Based Resources", IEEE, pp. 70-76, 2001.*
IBM, "Commands Reference, vol. 2", [online], pp. 1-4. [Retrieved on May 1, 2002]. Retrieved from the Internet at URL: <http://publibn.boulder.ibm.com/doc_link/en_US/a_doc_lib/cmds/aixcmds3/lmscode.htm>.
IBM, "Commands Reference, vol. 3", [online], pp. 1-3. [Retrieved on May 1, 2002]. Retrieved from the Internet at URL: <http://publibn.bould.ibm.com/doc_link/en_US/a_doc_lib/cmds/aixcmds3/lmscode.htm>.
IBM, "Understanding the Diagnostic Subsystem for AIX", [online], pp. 1-30, [Retrieved on May 1, 2002]. Retrieved from the Internet at URL: <http://publibn.boulder.ibm.com/doc_link/en_US/a_doc_lib/aixprggd/diagunsd/ServiceAids...>.

* cited by examiner

Primary Examiner—Ted T. Vo
(74) Attorney, Agent, or Firm—Dorsey & Whitney LLP

(57) ABSTRACT

Provided are a method, system and article of manufacture for a firmware image. A computer readable medium, comprises at least one data structure stored in the computer readable medium. The at least one data structure comprises a firmware image for installation on a hardware device and metadata, wherein the metadata is used to control the installation of the firmware image on the hardware device. A firmware update application on a data processing system interprets the metadata and based on the interpretation installs the firmware image on the hardware device. The firmware update application installs firmware images for different types of devices.

27 Claims, 11 Drawing Sheets

METHOD, SYSTEM AND ARTICLE OF MANUFACTURE FOR A FIRMWARE IMAGE

BACKGROUND OF THE INVENTION

1. Field of the Invention

The present invention relates to a method, system, and an article of manufacture for a firmware image.

2. Description of the Related Art

Computer systems include the capability to update firmware in connected hardware devices. Such firmware updates for hardware devices may be needed for various reasons, including fixing defects with an existing version of the firmware, adding additional functions to an existing version of the firmware, etc.

Prior art firmware updates may be targeted to a specific type of hardware device of a computer system. A firmware utility on a host computer may read a firmware image for a type of hardware device by various means, including downloading the firmware image via a network, reading the firmware image stored on fixed media such as a floppy diskette, CD-ROM, etc. The firmware utility may then install the firmware image on a hardware device coupled to the host computer. For example, a particular firmware utility may download the firmware image for a specific type of ethernet network interface card and install the firmware image on an ethernet network interface card coupled to the computer system.

Prior art utilities that download and install firmware are designed to update the firmware of a specific type of hardware device. Prior art firmware utilities cannot easily be enhanced to support firmware updates onto a new hardware device, particularly when the new hardware device is different (such as a device from a different vendor or a different type of device) from the hardware device for which the firmware utility is designed.

Hence, there is a need in the art to provide improved techniques for updating firmware of hardware devices.

SUMMARY OF THE PREFERRED EMBODIMENTS

Provided are a method, system and article of manufacture for a firmware image. A computer readable medium, comprises at least one data structure stored in the computer readable medium. The at least one data structure comprises a firmware image for installation on a hardware device and metadata, wherein the metadata is used to control the installation of the firmware image on the hardware device. A firmware update application on a data processing system interprets the metadata and based on the interpretation installs the firmware image on the hardware device. The firmware update application installs firmware images for different types of devices.

In certain further implementations, the metadata further comprises a header, wherein the header includes characteristics of a firmware update package that includes the firmware image. The metadata also comprises of dynamic constraints, wherein the firmware update application determines whether the dynamic constraints are satisfied before installing the firmware image on the hardware device. In still further implementations, the header further comprises a version number of the header, wherein the version number is read by the firmware update application to identify a version of the header. The header also comprises a name of a device dependent plug-in module, wherein the named device dependent plug-in module is invoked by the firmware update application to interpret the dynamic constraints to determine whether the dynamic constraints are satisfied.

The implementations provide a firmware image, metadata on the firmware image and a firmware update application for updating firmware on different types of hardware devices. The firmware update application interprets the metadata on a data processing system and based on the interpretation, installs the firmware image on a hardware device. The firmware update application separates device independent firmware update functions from device dependent firmware update functions, in a device independent application and a plurality of device dependent applications respectively. The implementations allow extensions of the firmware update application to support new and different types of devices, by writing new device dependent applications that can interface with the device independent application. As a result, the implementations simplify the development and maintenance of the firmware update application.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several implementations. It is understood that other implementations may be utilized and structural and operational changes may be made without departing from the scope of the present implementations.

Described implementations divide firmware update operations into device-independent and device dependent steps. Implementations provide a device independent application coupled to a plurality of device dependent applications for updating firmware in hardware devices coupled to a computer system. The device independent application is an application that does not perform operations that are dependent on characteristics of the hardware devices coupled to the computer system. The device dependent applications are applications that may contain operations that are dependent on characteristics of the hardware devices coupled to the computer system. A different device dependent application may be provided for each type of hardware device, including same device types from different vendors or different device types. The device independent and the device independent applications together provide a firmware update application. The implementations also provide a data structure for storing firmware images such that the firmware update application can interpret the data structure and update firmware images on hardware devices.

Figure 1:
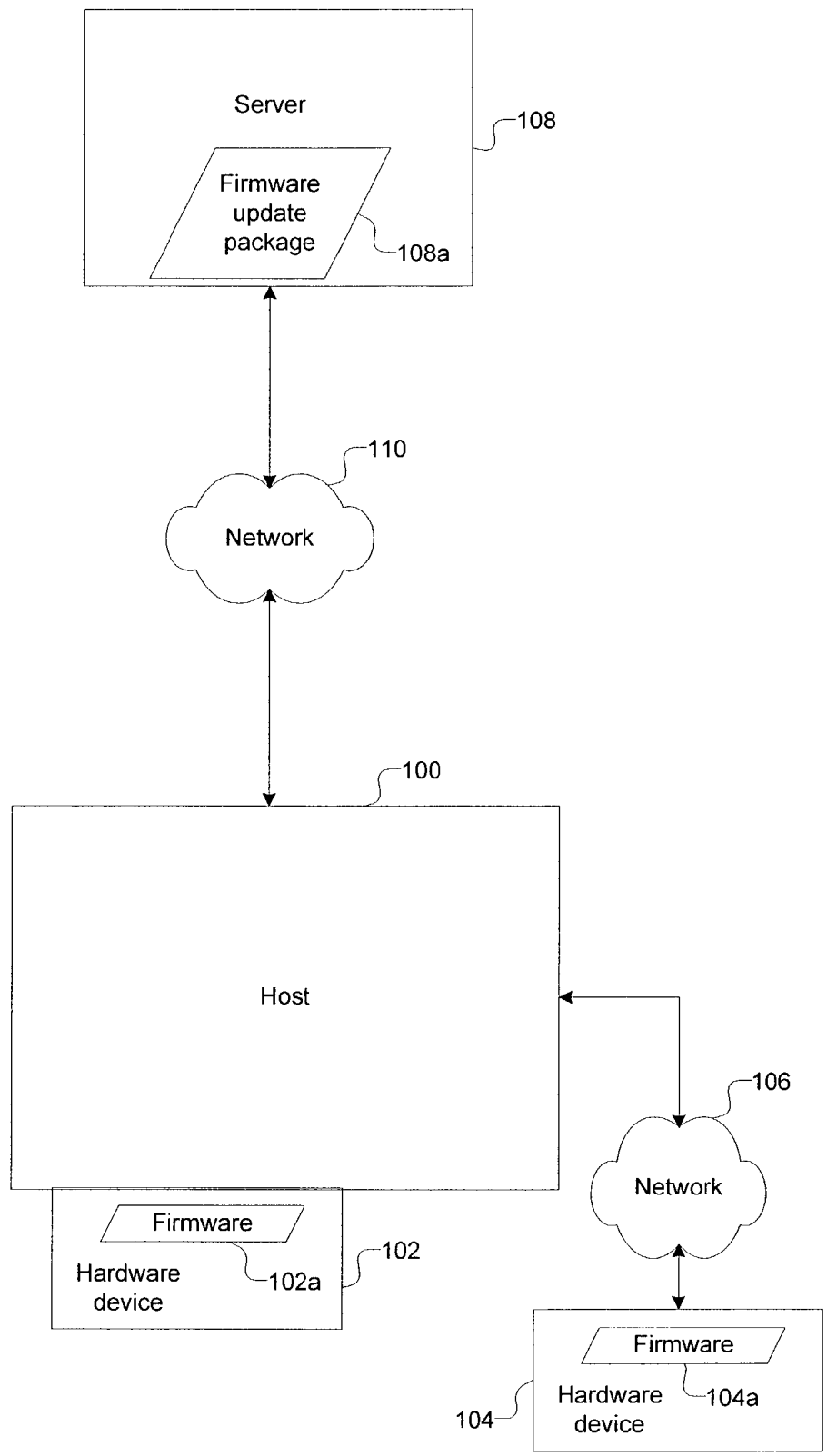
FIG. 1 illustrates a block diagram of a computing environment in which certain described aspects of the invention are implemented.

FIG. 1 illustrates a block diagram of a computing environment in which certain described aspects of the invention are implemented. A first computational device, such as a host 100, may be connected directly to a hardware device 102, and may be connected to a hardware device 104 over a network 106. Each hardware device 102, 104 is an instance of a type of hardware device, e.g. a disk drive, a tape drive, an optical disk drive, a printer, etc. For example hardware device 102 may be an instance of a particular type of disk drive. Although only two hardware devices 102 and 104 are shown, there may be fewer or more hardware devices connected to the host 100. The host 100 may also be connected to a second computational device, such as a server 108, over a network 110.

The host 100 and the server 108 may be any computational device known in the art, such as a personal computer, a workstation, a server, a mainframe, a hand held computer, a palm top computer, a telephony device, etc. The networks 106, 110 may be any network known in the art, such as the Internet, an intranet, a local area network, a wireless network, etc. The host 100 may alternatively be connected to the server 108 and the hardware device 104 without a network, such as through direct lines, common bus systems, etc., in a manner known in the art. Also each network 106, 110 may be part of one or more larger networks or may be an independent network or may be comprised of multiple interconnected networks.

The hardware devices 102 and 104 may contain firmware 102a and 104a respectively. The server 108 may contain a firmware update package 108a, where the host 100 may download the firmware update package 108a over the network 110 and use data contained within the firmware update package 108a to update the firmware 102a, 104a on hardware devices 102, 104. If a hardware device 102, 104 has provisions for including firmware but has no installed firmware, then the host 100 may download the firmware update package 108a over the network 110 and install the firmware on the hardware devices 102, 104.

Figure 2:
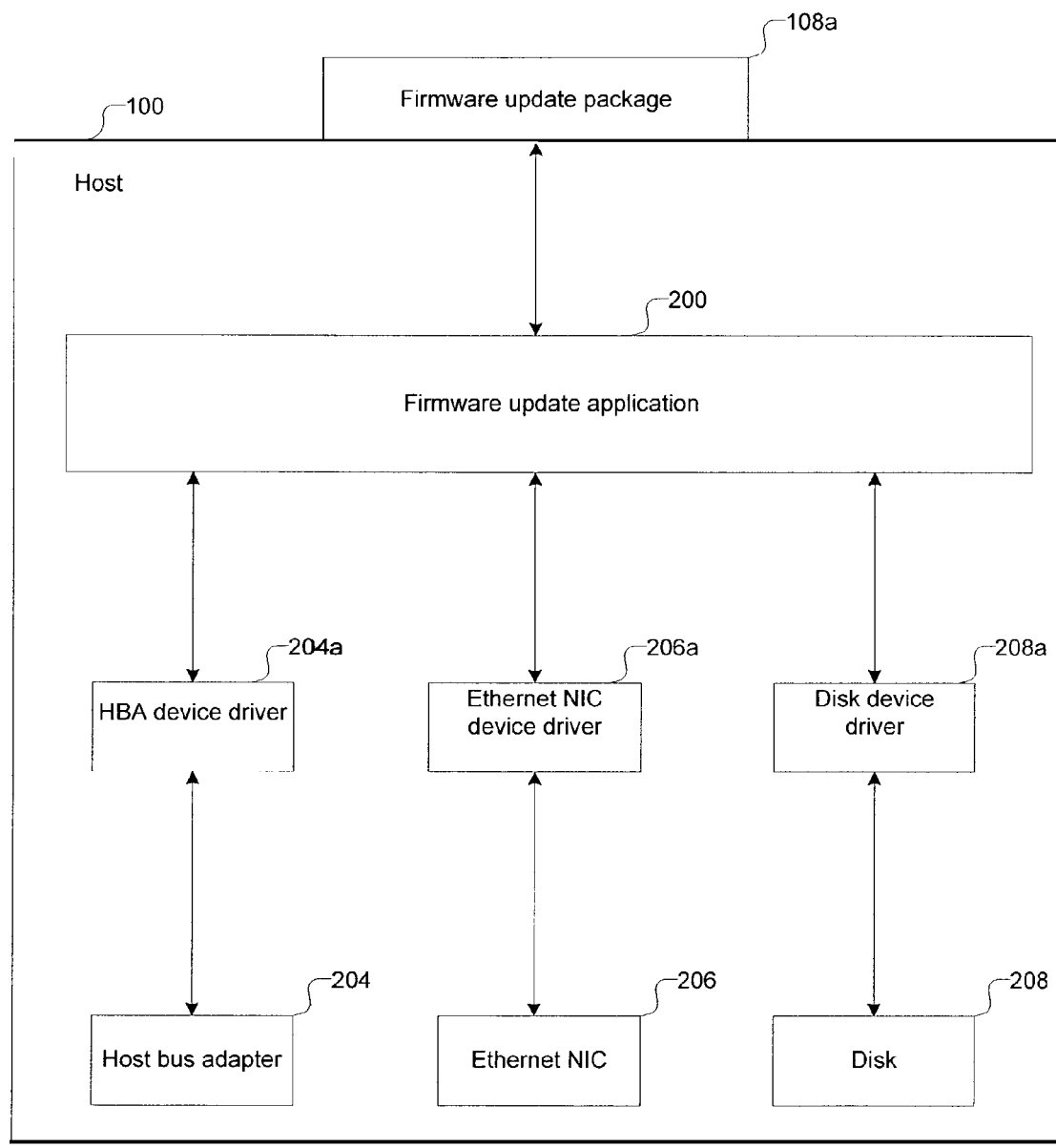
FIG. 2 illustrates a block diagram of software and hardware elements coupled to a host in which certain described aspects of the invention are implemented.

FIG. 2 illustrates a block diagram of software and hardware elements coupled to the host 100 in which certain described aspects of the invention are implemented. Within the host 100 resides a collection of software applications, where the collection is referred to as a firmware update application 200. In certain implementations, the firmware update application 200 can reside, for example, in user space on the host 100.

The host 100 is coupled to hardware devices, such as a host bus adapter 204, an ethernet NIC (network interface card) 206, a disk 208, etc. The hardware devices 204, 206, 208 contain firmware in a manner similar to hardware devices 102, 104. Also, the hardware devices 204, 206, 208 may be coupled to the host 100 in a manner similar to the way hardware devices 102, 104 are coupled to the host 100.

The host 100 includes device drivers, including a HBA (host bus adapter) device driver 204a, an ethernet NIC device driver 206a, and a disk device driver 208a to connect with the host bus adapter 204, the ethernet NIC 206, and the disk 208 respectively. In certain implementations, the device drivers 204a, 206a, 208a can reside, for example, in kernel space of the host 100. Although FIG. 2 illustrates three hardware devices 204, 206, 208 and three device drivers 204a, 206a, 208a communicating with the hardware devices 204, 206, 208 there may be a different number hardware devices and device drivers.

The firmware update application 200 may download the firmware update package 108a and install the firmware update package 108a on the host bus adapter 204, the ethernet NIC 206 and the disk 208. Instead of downloading the firmware update package 108a, the firmware update application 200 may read the firmware update package 108a from some fixed media such as a floppy disk or a CDROM.

Figure 3:
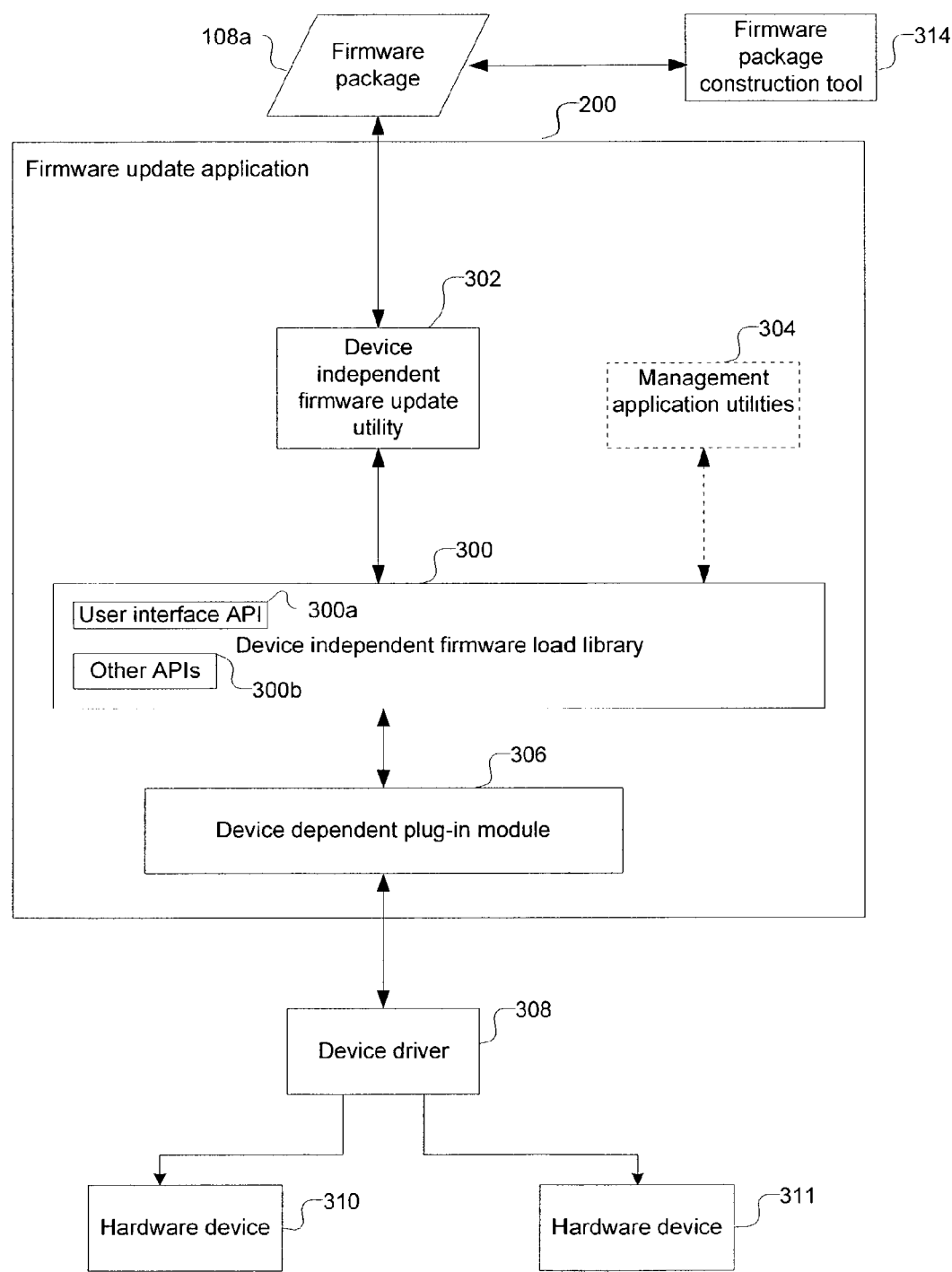
FIG. 3 illustrates a block diagram of a firmware update application for downloading firmware and elements coupled to the firmware update application in which certain described aspects of the invention are implemented.

FIG. 3 illustrates a block diagram of the firmware update application 200 for downloading firmware and elements coupled to the firmware update application 200 in which certain aspects of the invention are implemented. The firmware update application 200 includes a device independent firmware load library 300 which comprises a set of software library routines for performing various tasks, including manipulating and displaying user interface controls, receiving user input, generating user output, receiving and analyzing parts of the firmware package 108a, using the received parts of the firmware package 108a to interact with other software modules, etc. The application program interfaces (APIs) for invoking the various tasks are exposed by the device independent firmware load library 300. Programmers can code utilities by using the APIs of the device independent firmware load library 300, where the device independent firmware load library 300 comprises of a common set of library routines shared by such utilities. Hence, the device independent firmware load library 300 facilitates the writing of utilities that take advantage of the functions coded in the device independent firmware load library 300. Representative APIs exposed by the device independent firmware load library 300 include user interface APIs 300a, and other APIs 300b.

Applications that utilize the firmware update application 200, including a device independent firmware update utility 302 and management application utilities 304 may call the APIs 300a, 300b of the device independent firmware load library 300. There may be many such utilities 302, 304 that utilize the device independent firmware load library 300. Thus, the device independent firmware load library 300 provides a set of library routines for writing software applications that are part of the firmware update application 200.

The device independent firmware update utility 302 reads and interprets the firmware package 108a and uses the APIs of the device independent firmware load library 300 to interact with a user communicating via a command line user interface on the host 100.

The firmware update application 200 also has at least one device dependent plug-in module 306 communicating with one or more hardware devices 310, 311 including the firmware to update. The hardware devices 310, 311 may be attached directly to the host 100 motherboard, be installed directly on the host 100 motherboard, or may be attached to the host 100 through an interface. The communication of the device dependent plug-in module to the hardware devices 310, 311 takes place via a device driver 308. Although only one device dependent plug-in module 306 is shown there may a plurality of device dependent plug-in modules within the firmware update application 200, one for each attached hardware device 310, 311. The device dependent plug-in module 306 is specific to each type of hardware device 310, 311 and may also call the APIs of the device independent firmware load library 300. The hardware device 310, 311 may comprise the host bus adapter 204, the ethernet NIC 206, the disk 208, etc. The device driver 308 may comprise the HBA device driver 204a, the ethernet device driver 206a, the disk device driver 208a. For illustration, if the hardware device 310, 311 is the ethernet NIC 206 and the device driver 308 is the ethernet device driver 206a, then the device dependent plug-in module 306 would be an ethernet NIC plug-in module. There may be additional device drivers for different device types.

The device independent firmware update utility 302 is a device independent application that does not perform operations that are dependent on characteristics of the hardware device 310, 311. The device dependent plug-in modules 306 are device dependent applications that may contain operations dependent on characteristics of the hardware device 310, 311.

An entity, such as a software vendor, that creates the firmware update application 200, may provide a firmware package construction tool 314, where the firmware package construction tool 314 may be used by different vendors to construct the firmware package 108a. The firmware package construction tool 314 ensures that data structures comprising the firmware package 108a are compatible with the firmware update application 200.

Figure 4:
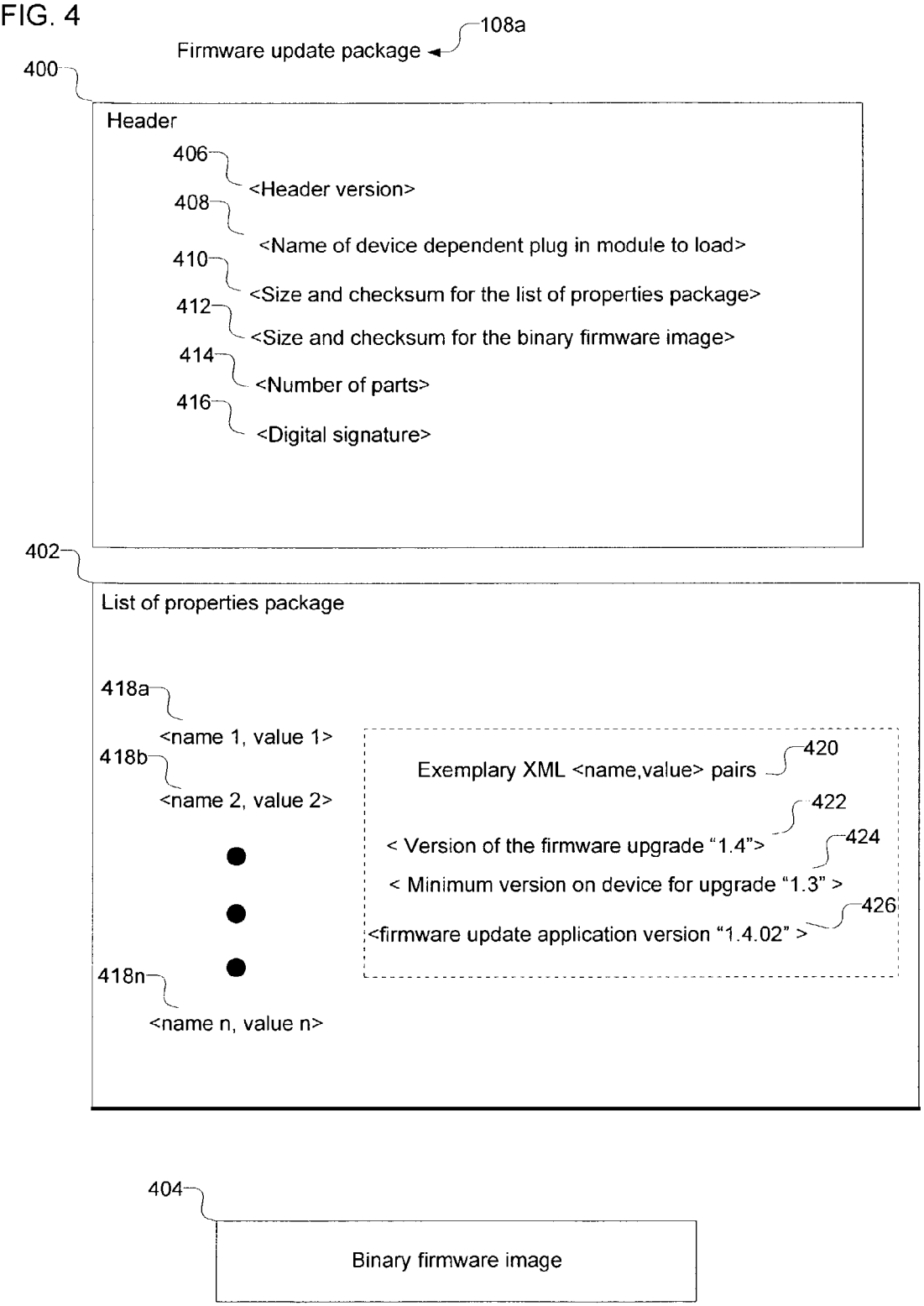
FIG. 4 illustrates a block diagram of various components of a firmware update package in which certain described aspects of the invention are implemented.

FIG. 4 illustrates components in the firmware update package 108a in accordance with certain implementations of the invention. The firmware update package 108a may include a header 400, a list of properties package 402, and a binary firmware image 404. The header 400 and the list of properties package 402 include metadata related to the binary firmware image 404. The device independent firmware update utility 302 may primarily process the header 400 that has device independent constraints, whereas the device dependent plug-in module 306 may primarily processes the list of properties package 402 that has device dependent dynamic constraints.

The header 400 includes various fields that may be represented in a variety of formats including extensible markup language (XML). A <header version> field 406 includes the version number of the header. A <name of device dependent plug-in module to load> field 408 includes the name of the device dependent plug-in module 306, where the components within the firmware update package 108a are intended to be processed by the device dependent plug-in module 306 indicated in the <name of device dependent plug-in module to load> field 408. The <name of device dependent plug-in module to load> field 408 may also be used by device independent firmware update utility 302 to determine what plug-in module to load.

The header 400 includes a <size and checksum for the list of properties package> field 410 that indicates the size and checksum of the list of properties package 401. The header 400 may further include a <size and checksum for the binary firmware image> field 412 that includes the size and checksum of the binary firmware image 404.

The header 400 may also include a <number of parts> field 414, that indicates the number of parts of a multi-part file used to install the binary firmware image 404. The header may also include a digital signature 416 for security. The device independent firmware update utility 302 may read the digital signature 416 to confirm that the firmware update package 108a has been read from an authorized source and unauthorized modifications have not been made to the firmware update package 108a. The digital signature 416 may not be necessary if the download of the firmware update package 108a is via a trusted distribution mechanism.

The list of properties package 402 contains properties, where each property is a dynamic constraint that may need to be satisfied before the firmware update application 200 installs the binary firmware image 404 on the hardware device 310, 311. The device dependent plug-in module 306 processes the dynamic constraints in addition to static constraints included in the device dependent plug-in module 306. For example, a dynamic constraint may indicate the version of the firmware upgrade in the firmware update package 108a. Since every new firmware update package 108a may have a different version, the version of the firmware upgrade can only be part of a dynamic constraint as the information cannot be known a priori to the device dependent plug-in module 306.

The list of properties package 402 may be implemented in different formats, such as a list of XML type <name, value> pairs 418a, 418b, . . . 418n. A set of exemplary XML name value pairs 420 may include the version of the firmware upgrade as "1.4" (reference numeral 422). In certain implementations the version of the firmware upgrade and the corresponding value may be the only <name value> pair on the list of properties package 402. The minimum version on device for upgrade may be "1.3" (reference numeral 424) implying that unless the device has a firmware version of 1.3 or greater the firmware update application 200 should not install the binary firmware image 404 on the hardware device 310, 311. The firmware update application version may be "1.4.02" (reference numeral 426) indicating a version of the firmware update application 200 that can apply the firmware update package 108a. Various <name, value> pairs may be included in the list of properties package 402. Also, some of the properties may be optional in the list of properties package 402. Other representational mechanisms besides <name, value> pair, such as hash tables, key and value pairs, etc., may also be used to represent the properties in the list of properties package 402.

The device independent firmware update utility 302 extracts the list of properties package 402 from the firmware update package 108a and forwards the firmware update package 108a to the device dependent plug-in module 306. In alternative implementations, the device independent firmware update utility 302 may extract the <name, value> pairs from the list of properties package 402 and forward the name value pairs to the device dependent plug-in module 306. The device dependent plug-in module 306 uses the <name, value> pairs to apply the dynamic constraints for the firmware update encapsulated into the <name, value> pairs.

The <name, value> pairs may be processed in a variety of ways, including via a libnvpair library in the Solaris** 8 operating system. The libnvpair library exports a set of functions for managing <name, value> pairs. Further details of the libnvpair library are available in the Solaris 8 Reference Manual Collection (copyright 1994–2002, Sun Microsystems Inc.).

\*\* Solaris is a trademark of Sun Microsystems, Inc.

Figure 5:
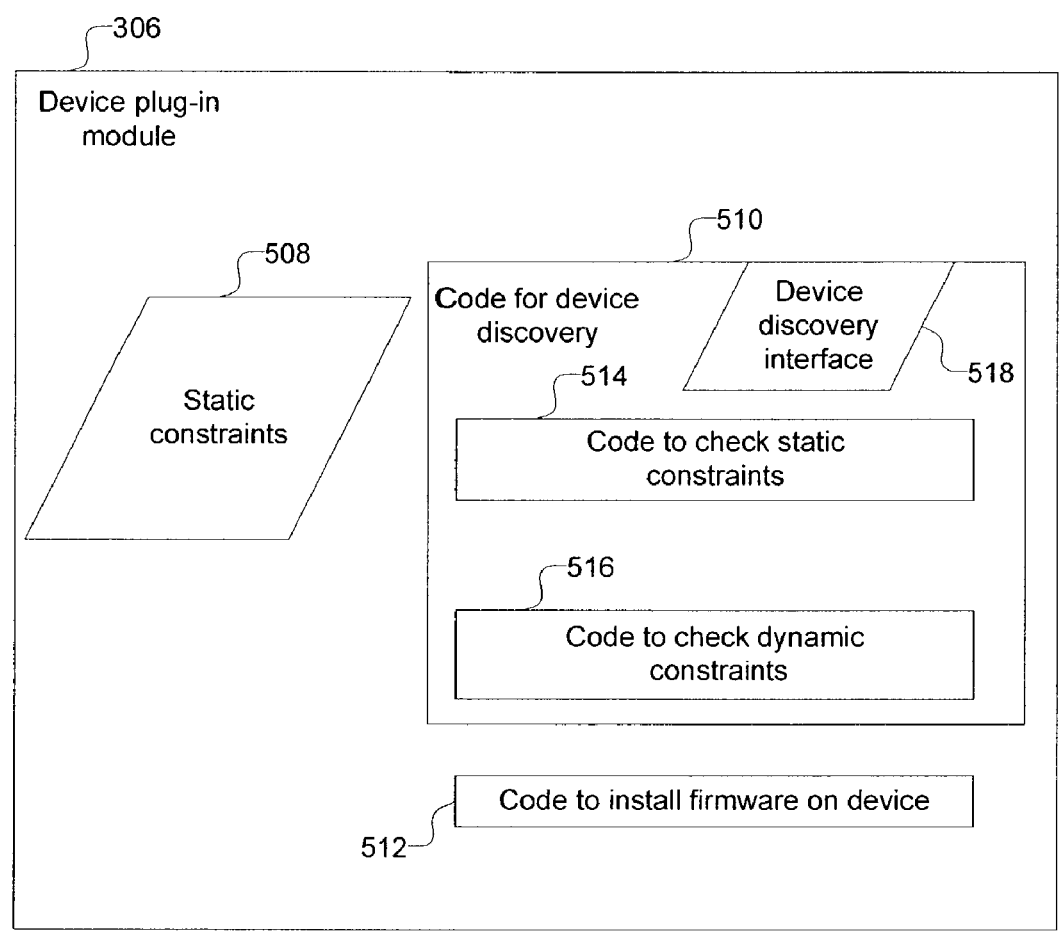
FIG. 5 illustrates a block diagram of a device dependent plug-in module in which certain described aspects of the invention are implemented.

FIG. 5 illustrates a block diagram of the device dependent plug-in module 306 in which certain aspects of the invention are implemented. The device dependent plug-in module 306 includes static constraints 508 that do not change over time, i.e., the static constraints 508 are part of the device dependent plug-in module 306. The static constraints 508 may include a variety of constraints such as a listing of hardware devices 310, 311 that are compatible with the device dependent plug-in module 306, the versions of the firmware update application 200 the device dependent plug-in module 306 is compatible with, etc. The static constraints may have to be satisfied before the firmware update application 200 installs the binary firmware image 404 on the hardware device 310, 311.

The device dependent plug-in module 306 also includes code for device discovery 510 and code (indicated by reference numeral 512) to install the binary firmware image 404 on the hardware device 310, 311. The code for device discovery 510 determines hardware devices 310, 311 on which the binary firmware image 404 may be installed. The code to install firmware on device 512 is code that when executed updates the firmware on the hardware device 310, 311.

The code for device discovery 510 may include code to check static constraints 514 that checks for static constraints 508. The code for device discovery 510 may also include code to check dynamic constraints 516, that checks the dynamic constraints that appear in the list of properties package 402. The code for device discovery 510 may also include a device discovery interface 518 that is a set of APIs used to discover hardware devices 310, 311 that satisfy the static constraints 508 and the dynamic constraints present in the list of properties package 402.

Figure 6:
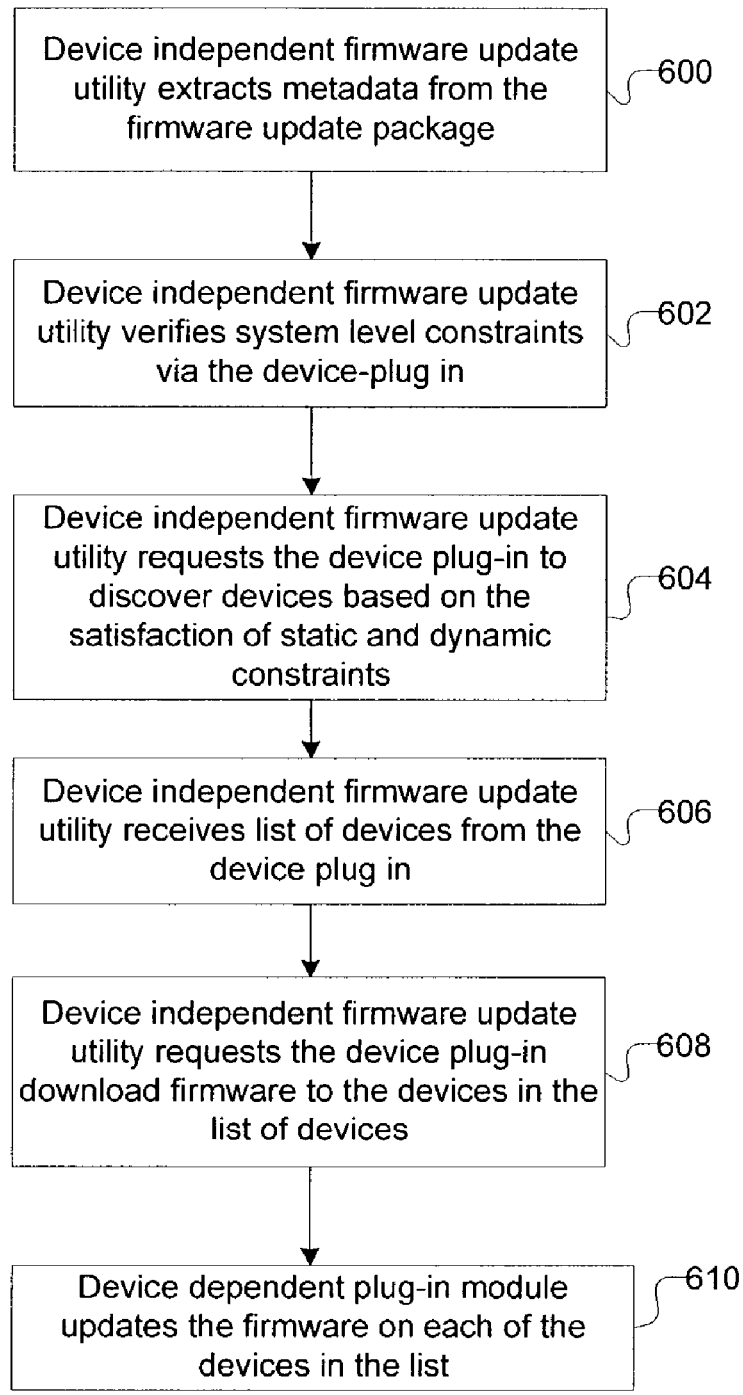
FIG. 6 illustrates an overview of logic implemented in the device independent firmware update utility and the device dependent plug-in module for updating firmware, in accordance with certain described implementations of the invention.

FIG. 6 illustrates overview of logic implemented in the device independent firmware update utility 302 and the device driver plug-in module 306 for updating firmware, in accordance with certain described implementations of the invention. The process starts at block 600, where the device independent firmware update utility 302 after receiving the firmware update package 108a extracts the metadata included in the header 400 and list of properties package 402. Control proceeds to block 602, where the device independent firmware update utility 302 verifies the system level constraints via the device dependent plug-in module 306. The system level constraints may include various constraints that are related to the host 100 and the software and hardware coupled to the host 100. For example, a system level constraint may check whether there is adequate storage and memory available on the host 100 for running the various components of the firmware update application 200. Control proceeds to block 604, where the device independent firmware update utility 302 requests the device dependent plug-in module 306 to discover hardware devices 310, 311 based on the satisfaction of static constraints 508 and dynamic constraints present in the list of properties package 402.

The device independent firmware update utility 302 receives (at block 606) a list of hardware devices that satisfy the static constraints 508 and the dynamic constraints present in the list of properties package 402 from the device dependent plug-in module 306, i.e., the binary firmware image 404 may be installed on the hardware devices in the list. In certain implementations, the device independent firmware update utility 302 receives a complete list of hardware devices supported by the device dependent plug-in module 306, and the list indicates whether or not each hardware device has met the static constraints 508 and the dynamic constraints present in the list of properties package 402. At block 608, the device independent firmware update utility 302 requests the device dependent plug-in module 306 to download firmware to the hardware devices 310, 311 in the list of hardware devices returned by the device dependent plug-in module 306. Control proceeds to block 610, where the device dependent plug-in module 306 updates the firmware on each of the hardware devices 310, 311 on the list of hardware devices.

Figure 7:
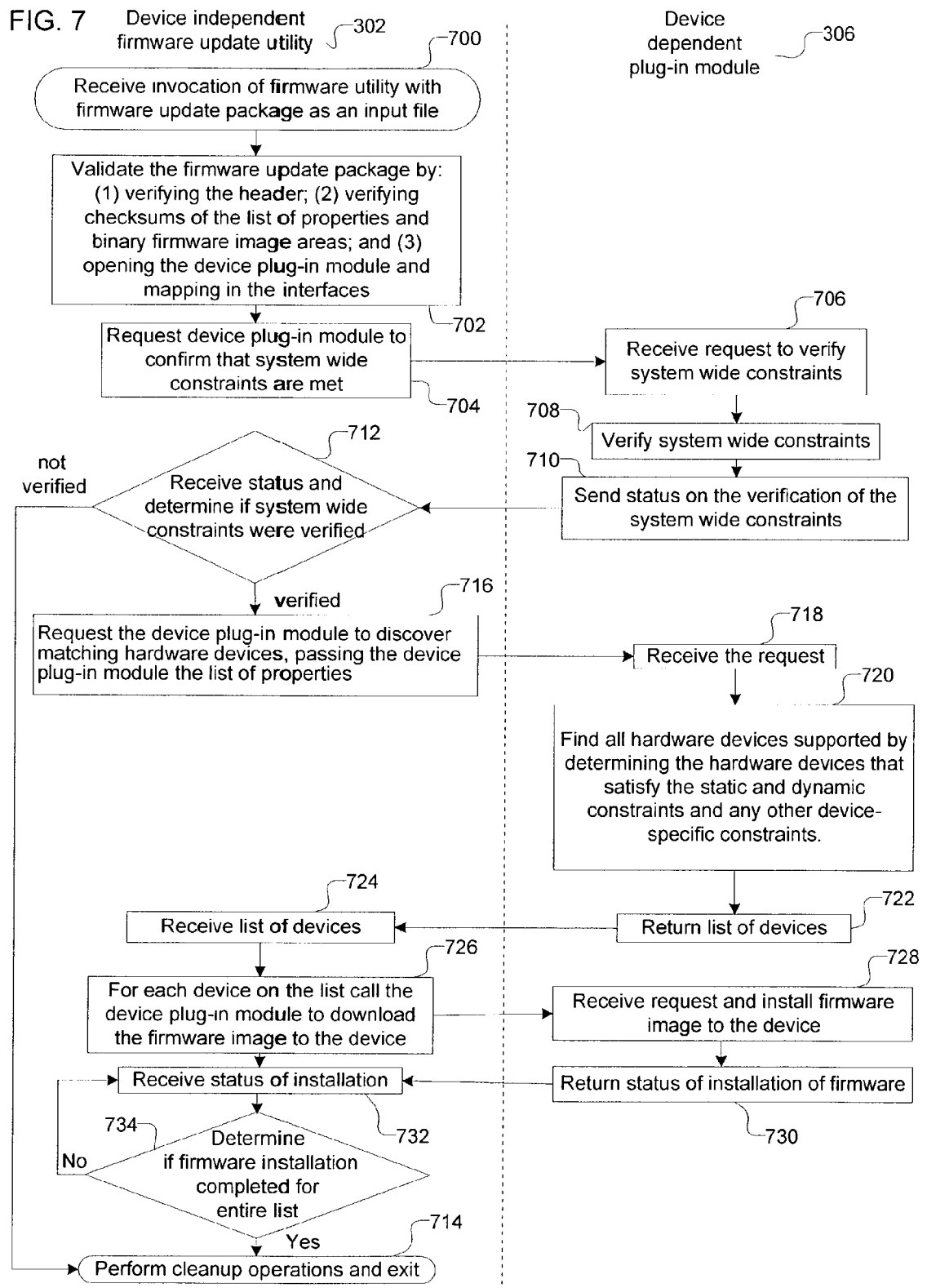
FIG. 7 illustrates logic implemented in a framework for downloading firmware, in accordance with certain described implementations of the invention.

FIG. 7 illustrates more detailed logic implemented in the firmware update application 200 by the device independent firmware update utility 302 and the device dependent plug-in module 306. A user or an automated program calls the device independent firmware update utility 302 for installing the binary firmware image 404 with the firmware package 108a as an input file. In alternative implementations, the call to the device independent firmware update utility 302 may come from an external system over a network. At block 700, the device independent firmware update utility 302 receives the call from the user or the automated program. Control proceeds to block 702, where the device independent firmware update utility 302 validates the firmware package 108a by first verifying that the information in the header 400 is syntactically and semantically correct. Then the device independent firmware update utility 302 reads the <size and checksum for the list of properties package> field 410 and verifies that the size and checksum of the list of properties package 402 is correct. Subsequently, the device independent firmware update utility 302 reads the <name of device dependent plug-in module to load> field 408 and based on the name calls the appropriate device dependent plug-in module 306. The device dependent plug-in module 306 has callable interfaces, including data structures and variables, in a format that is different from the data structures and variables used by the device independent firmware update utility 302. The device independent firmware update utility 302 structures the data structures and variables of the device independent firmware update utility 302 to map to the data structure and variables in the interfaces of the device dependent plug-in module 306.

Control proceeds to block 704, where the device independent firmware update utility 302 requests the device dependent plug-in module 306 to confirm that system wide constraints are being satisfied before proceeding with the firmware installation. The system wide constraints may be distributed within the firmware update application 200 or the firmware package 108a, and may include constraints such as the version of the operating system, the amount of available storage, etc., that may need to be satisfied before installing the binary firmware image 404. The device dependent plug-in module 306 receives (at block 706) the request to verify the system wide constraints. The device dependent plug-in module 306 verifies (at block 708) the system wide constraints. If the system wide constraints are satisfied then the status is said to be "verified." In contrast, if the system wide constraints are not satisfied then the status is said to be "not verified." The device dependent plug-in module 306 sends (at block 710) the status on the verification of the system wide constraints to the device independent firmware update utility 302.

At block 712, the device independent firmware update utility 302 receives the status on the verification of the system wide constraints from the device dependent plug-in module 306. If the system wide constraints are "not verified" (at block 712), then control proceeds to block 714 where the device independent firmware update utility 302 performs cleanup operations and exits. Cleanup operations may include closing files that are open, disposing of pointer data structures, closing network connections, etc. If at block 712, the device independent firmware update utility 302 receives a "verified" status for the system wide constraints, then control proceeds to block 716 where the device independent firmware update utility 302 passes the device dependent plug-in module 306 the list of properties package 402 containing the dynamic constraints, and requests the device dependent plug-in module 306 to discover matching hardware devices 310, 311 for firmware update.

Control proceeds to block 718, where the device dependent plug-in module 306 receives the request to discover matching hardware devices 310, 311. At block 720, the device dependent plug-in module 306 finds all matching hardware devices 310, 311 that satisfy the static constraints 508 and the dynamic constraints provided by the list of properties package 402. The various constraints may be analyzed by checking registry entries, by checking conformance to plug-and-play specifications, by making SCSI inquiries, etc., for the attached hardware devices 310, 311, etc., on the host 100. If there are any additional device specific static constraints 508 the device dependent plug-in may also check that such additional static constraints 508 are also satisfied by the matching hardware devices 310, 311. Based on the satisfaction of the static and dynamic constraints, the device dependent plug-in module 306 creates a list of matching hardware devices on which the binary firmware image 404 can be installed.

Control proceeds to block 722, where the device dependent plug-in module 306 returns the list of matching hardware devices to the device independent firmware update utility 302. The device independent firmware update utility 302 receives (at block 724) the list of matching hardware devices. Control proceeds to block 726, where the device independent firmware update utility 302 calls the device dependent plug-in module 306 to read the binary firmware image 404 for each device on the list of matching hardware devices. The reading may include downloading the binary firmware image 404 from the server 108 if only the network address, such as an Universal Resource Locator (URL), of the binary firmware image 404 is included in the firmware update package 108a. Otherwise, the reading includes reading the binary firmware image 404 in the already downloaded firmware update package 108a. For every request received by the device dependent plug-in module 306, the device dependent plug-in module 306 installs (at block 728) the binary firmware image 404 on the corresponding device on the list of matching hardware devices. The device dependent plug-in module 306 then returns (at block 730) the status of the firmware installation to the device independent firmware update utility 302. The device independent firmware update utility 302 receives (at block 732) the status of the firmware installation. Control proceeds to block 734 where the device independent firmware update utility 302 determines if firmware installation has been completed for all matching hardware devices. If so, control proceeds to block 714 where the device independent firmware update utility 302 performs cleanup operations and exits. If not, control returns to block 732 and the device independent firmware update utility 302 waits for receiving status of firmware installation for each hardware device on the list of matching hardware devices from the device dependent plug-in module 306.

Figure 8:
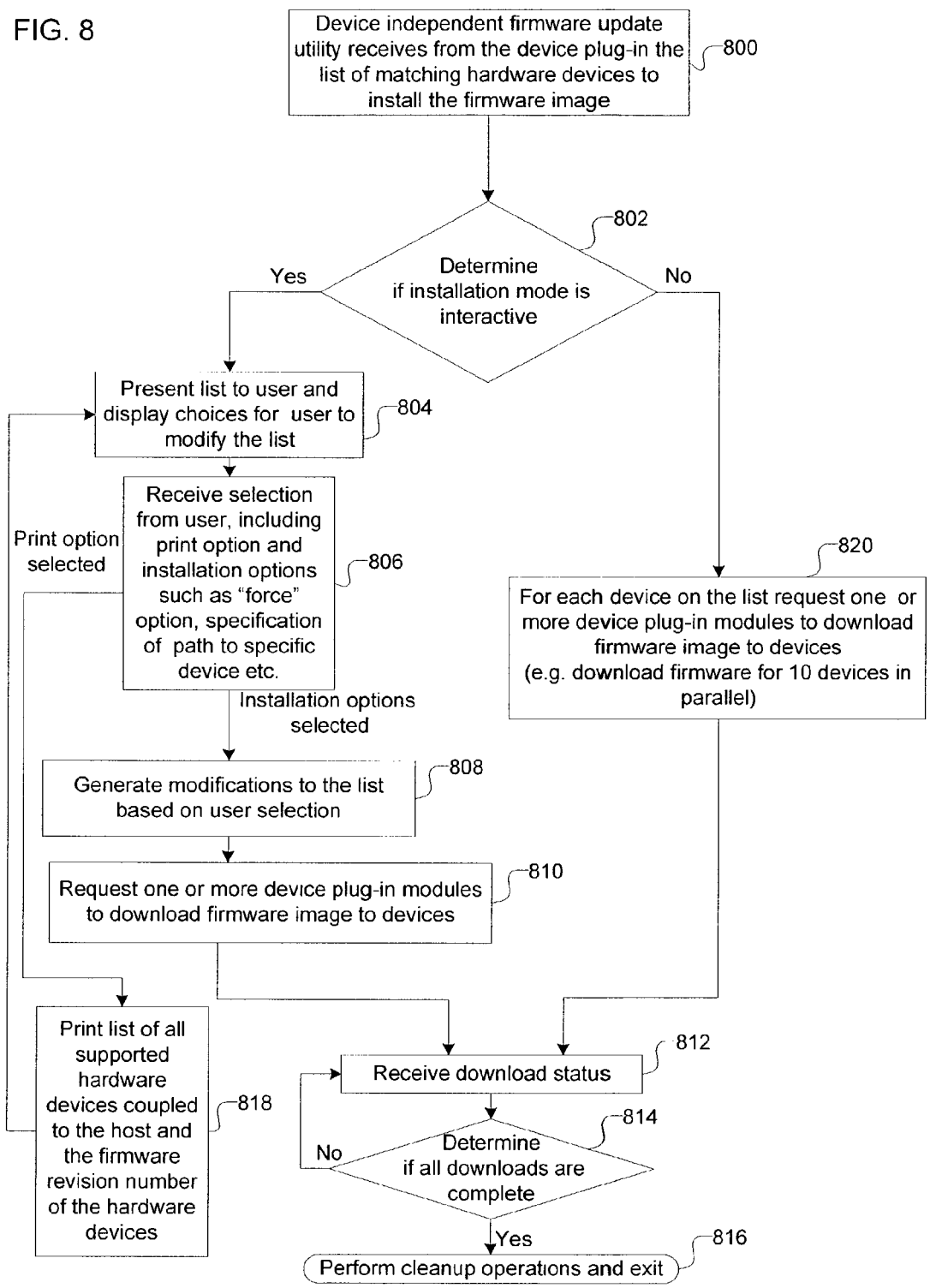
FIG. 8 illustrates logic implemented in a framework for installing firmware, where the logic may provide for interactive user input, in accordance with certain described implementations of the invention.

FIG. 8 illustrates logic implemented in the device independent firmware update utility 302, where the logic may provide for interactive user input while installing firmware, in accordance with certain implementations of the invention. At block 800, the device independent firmware update utility 302 receives (similar to block 724) the list of matching hardware devices from the device dependent plug-in module 306. The device independent firmware update utility 302 determines (at block 802) if firmware installation mode is interactive, i.e., there is a user who may interact with the device independent firmware update utility 302.

If the firmware installation mode is interactive, then control proceeds to block 804 where the device independent firmware update utility 302 presents a list of selections to the user, including the list of matching hardware devices. In alternative implementations, the device independent firmware update utility 302 may present other types of information besides a list of selections to the user. The device independent firmware update utility 302 may also display choices to the user to modify the list. The device independent firmware update utility 302 generates the graphical user interface needed for displaying such choices to the user by using the user interface API 300a in the device independent firmware load library 300.

Control proceeds to block 806, where the device independent firmware update utility 302 receives a selection from the user. The selection may take a variety of forms including a "force" option whereby a user may override the list of matching hardware devices displayed and perform operations according to the choices of the user. For example, the user may choose not to install firmware on a device that does appear on the list of matching hardware devices. The user may also specify a path or a location where the firmware for a specific device may be placed. At block 806, the device independent firmware update utility 302 also determines whether the user selected a print option or a firmware installation option.

If at block 806, the device independent firmware update utility 302 determines that the user has selected the option to install firmware updates, the device independent firmware update utility 302 generates (at block 808) modifications to the list of matching hardware devices based on the selections received from the user at block 806. Control proceeds to block 810, where the device independent firmware update utility 302 requests one or more device dependent plug-in modules 306 to install the binary firmware image 404 on the hardware devices on the modified list.

Control proceeds to block 812, where the device independent firmware update utility 302 waits to receive the download status from the device dependent plug-in modules 306 (similar to block 732). The device independent firmware update utility 302 determines (at block 814) if all firmware installations are complete (similar to block 734). If so, at block 816 the device independent firmware update utility 302 performs cleanup operations and exits (similar to block 714). If not, control returns to block 812 from block 816, and the device independent firmware update utility 302 waits to receive another download status.

If at block 806, the device independent firmware update utility 302 determines that the user selected the print option then control proceeds to block 818 where the device independent firmware update utility 302 prints a list of all the supported hardware devices 310, 311 coupled to the host 100 and the firmware revision number of the hardware devices 310, 311. The printed list allows the user to view the firmware on hardware devices 310, 311 on a host 100. Instead of printing, the result may be displayed on a screen or communicated in any other manner known in the art to the user. Subsequently, control returns back to block 806.

If at block 802, the device independent firmware update utility 302 determines that the firmware installation mode is not interactive, then the device independent firmware update utility 302 requests (at block 820) one or more device dependent plug-in modules 306 to install the binary firmware image 404 onto hardware devices on the list of attached hardware devices. For example, the device independent firmware update utility 302 may request device dependent plug-in module 306 to install firmware on ten devices in parallel. Control then proceeds to the previously described block 812.

Figure 9:
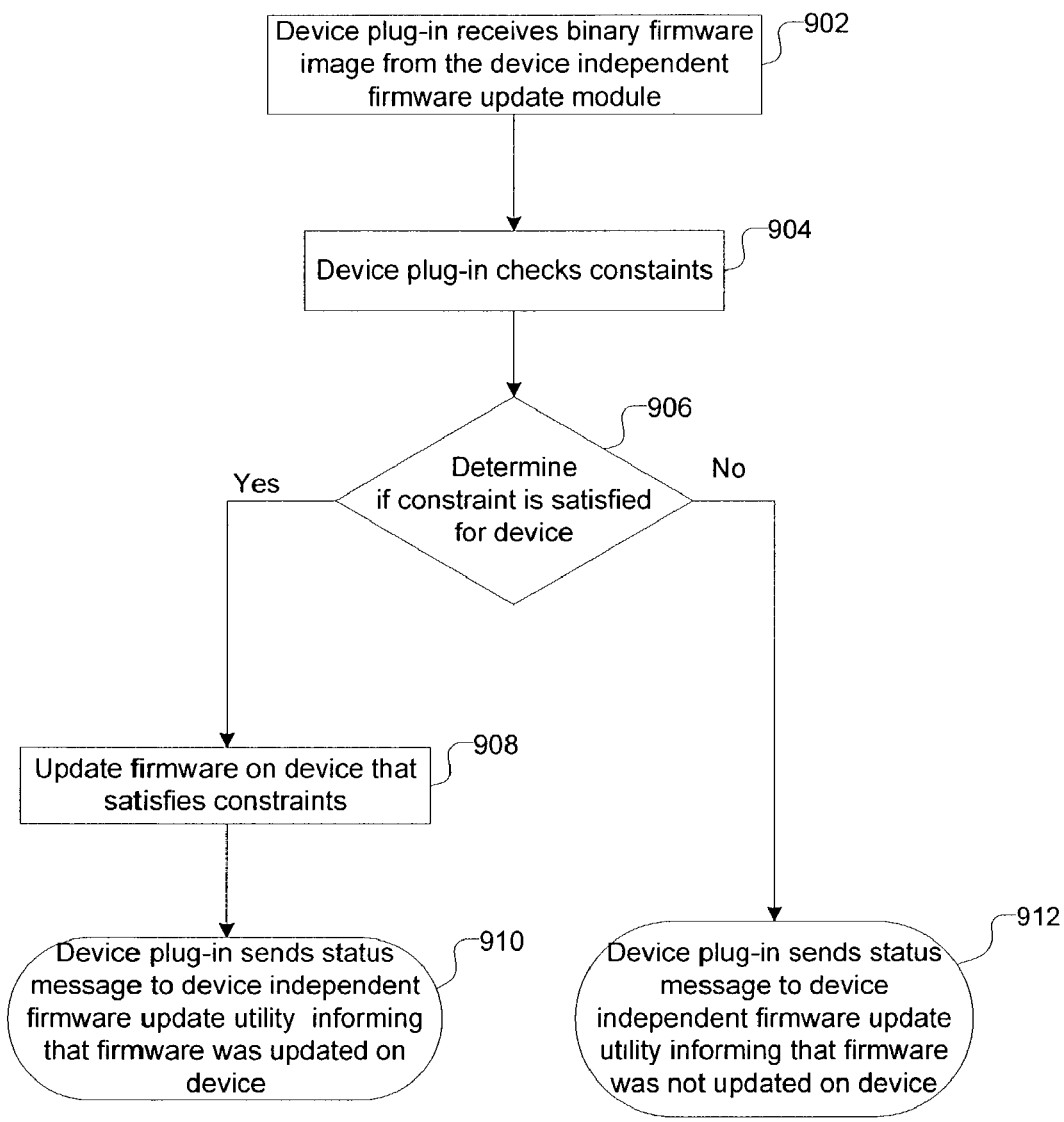
FIG. 9 illustrates logic implemented in a device dependent plug-in, in accordance with certain described implementations of the invention.

FIG. 9 illustrates logic implemented in a device dependent plug-in module, in accordance with an alternative implementation of the invention. In FIG. 9, at block 902, the device dependent plug-in module 306 receives the binary firmware image 404 sent by the device independent firmware update utility 302. For every hardware device 310, 311, the device dependent plug-in module checks (at block 904) static, dynamic and system wide constraints to determine whether the hardware device 310, 311 satisfies the constraints. If so, control proceeds to block 908 where the device independent firmware update utility 302 updates the firmware on a hardware device 310, 311.

Control proceeds to block 910, where the device dependent plug-in module 306 sends a status message to the device independent firmware update utility 302 to indicate that firmware was installed on the hardware device 310, 311. If at block 906, the device dependent plug-in module 306 determines that constraints are not satisfied for a hardware device 310, 311, control proceeds to block 912 where the device dependent plug-in module 306 sends a status message to the device independent firmware update utility 302 informing that firmware was not updated on the hardware device 310, 311.

Figure 10:
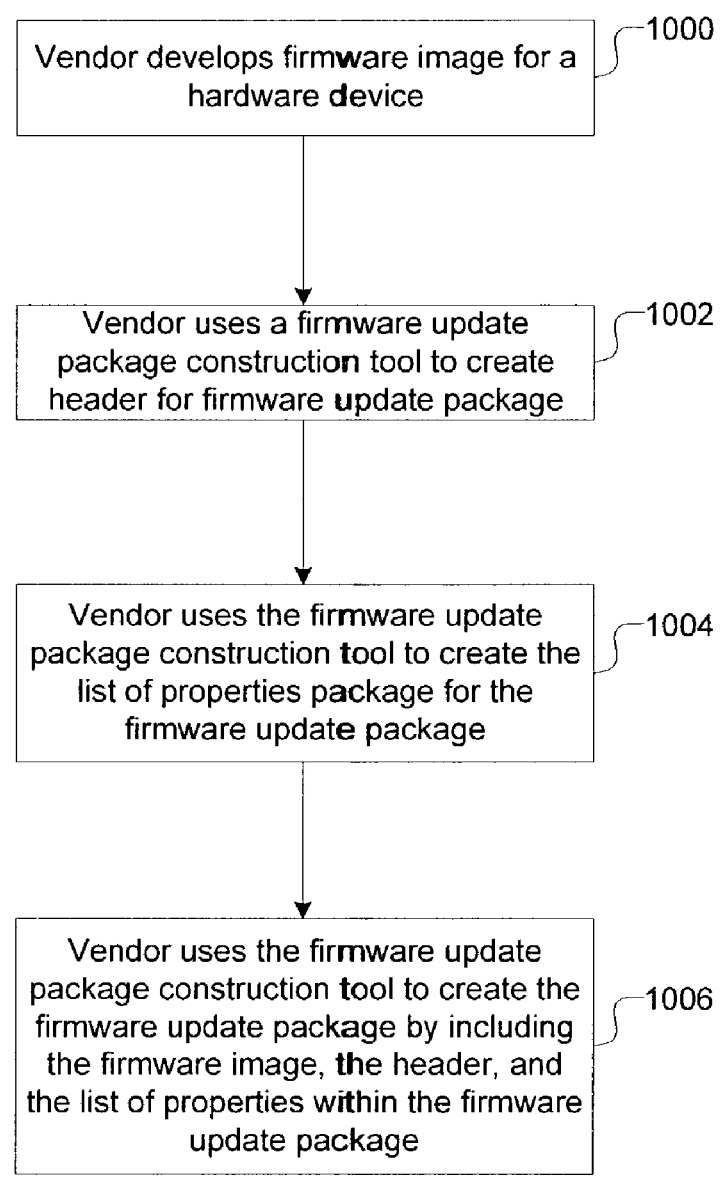
FIG. 10 illustrates logic to create a firmware update package, in accordance with certain described implementations of the invention.

FIG. 10 illustrates logic to create the firmware update package 108*a*, in accordance with certain implementations of the invention. At block 1000 an entity, such as a vendor of a hardware device, develops a binary firmware image 404 for a hardware device 310, 311. Control proceeds to block 1002, where the vendor uses the firmware update package construction tool 314 (indicated in FIG. 3) to create the header 400 for the firmware update package 108*a*.

Control proceeds to block 1004, where the vendor uses the firmware update package construction tool 314 to create the list of properties package 402 for the firmware update package 108*a*. The vendor further includes the firmware update package construction tool 314 to create (at block 1006) the firmware update package 108*a* by including the header 400, the list of properties package 402 and the binary firmware image 404 within the firmware update package. Subsequently, the firmware update package 108*a* may be installed on the server 108 or may be distributed in any other manner known in the art.

The implementations provide a firmware image, metadata on the firmware image and a firmware update application for updating firmware on different types of hardware devices. The firmware update application interprets the metadata on a data processing system and based on the interpretation, installs the firmware image on a hardware device.

The implementations provide the firmware update application for updating firmware on different types of hardware devices. The firmware update application comprises a device independent firmware update utility and a plurality of device dependent plug-in modules. The device independent firmware update utility initiates the update of firmware on a plurality of different types of hardware devices and requests device specific functions from device dependent plug-in modules. A different device dependent plug-in module may be provided for each type of hardware device. Thus the firmware update application separates device independent firmware update functions from device dependent firmware update functions.

The implementations allow extensions of a firmware update application to support new and different types of devices, by writing new device dependent plug-in modules to the APIs of the firmware update application. As a result, the implementations simplify the development and maintenance of the firmware update application. Furthermore, the firmware update application provides a single unified application with an uniform interface to download firmware to many different types of devices.

The implementations also provide a firmware update package for storing firmware images such that the firmware update application can interpret the firmware update package and update firmware images on hardware devices. The firmware update package can be distributed either by a server or on a fixed media. Dynamic constraints that should be satisfied before installing firmware on a device are distributed as part of the firmware update package.

The implementations also facilitate the development of the device independent firmware update utility by providing a set of library routines that capture the common tasks performed by different types of device independent update utilities. Programmers may code different types of firmware update and other utilities by using the APIs of the library routines.

The implementations also enable an entity, such as an user or an automated program, to manually control the process of firmware update by modifying a list of hardware devices to update, where the list of hardware devices to update is presented to the entity by the firmware update application.

The implementations allow the functionality of the firmware update application to be extended without writing a new standalone application. Device independent functionality is provided by the device independent firmware update utility and device-specific functionality is provided by the device dependent plug-in modules. The device independent firmware update utility does not contain logic that is dependent on the types of hardware devices supported. Supporting a new type of hardware device does not require updating the device independent firmware update utility. Since generic capabilities for firmware updates are exposed via APIs another type of application can take advantage of the capabilities programmatically. Furthermore, the APIs provide a robust and secure interface between the device-independent firmware update utility and the device-dependent plug-in modules.

Additional Implementation Details

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium, such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the implementations, and that the article of manufacture may comprise any information bearing medium known in the art.

Figure 11:
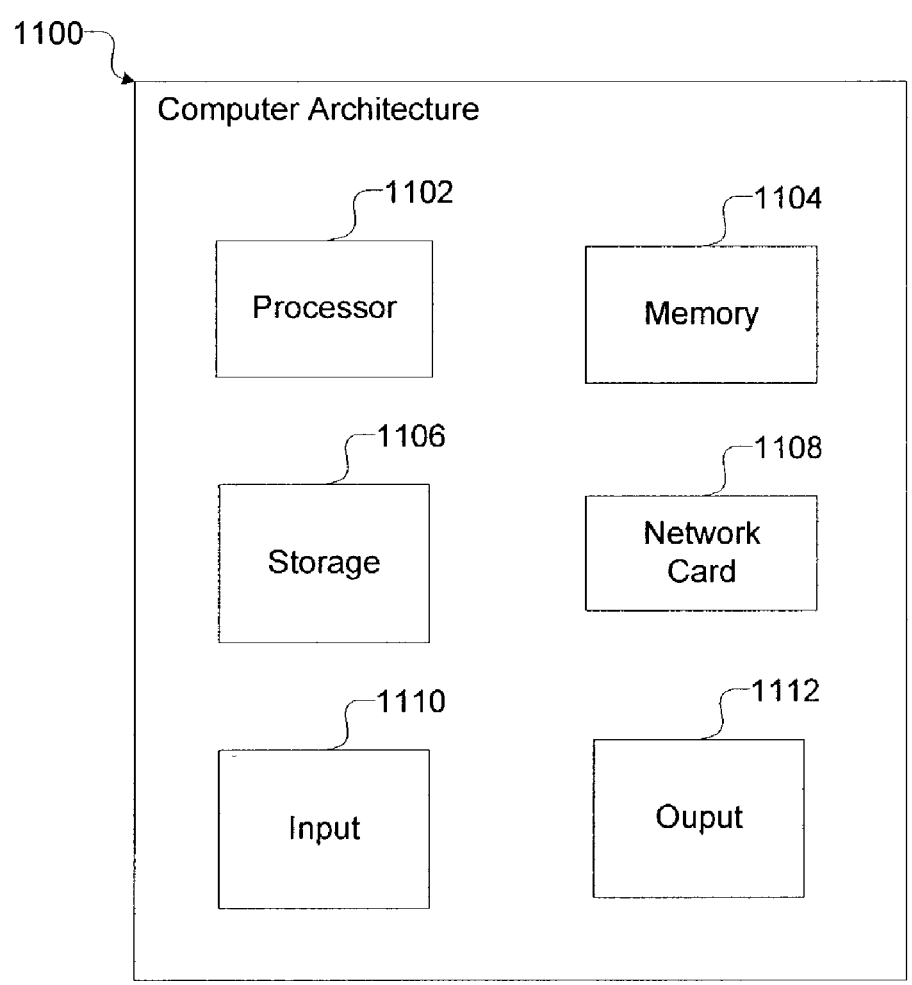
FIG. 11 illustrates a block diagram of a computer architecture in which certain described aspects of the invention are implemented.

FIG. 11 illustrates a block diagram of a computer architecture in which certain aspects of the invention are implemented. FIG. 11 illustrates one implementation of the host 100 and the server 108. These systems 100, 108 may implement a computer architecture 1100 having a processor 1102 (e.g., a microprocessor), a memory 1104 (e.g., a volatile memory device), and storage 1106 (e.g., a nonvolatile storage, such as magnetic disk drives, optical disk drives, a tape drive, etc.). The storage 1106 may comprise an internal storage device or an attached or network accessible storage. Programs in the storage 1106 may be loaded into the memory 1104 and executed by the processor 1102 in a manner known in the art. The architecture further includes a network card 1108 to enable communication with a network. The architecture may also include at least one input 1110, such as a keyboard, a touchscreen, a pen, voice-activated input, etc., and at least one output 1112, such as a display device, a speaker, printer, etc.

The implementations of FIGS. 6 to 10 describe specific operations occurring in a particular order. Further, the steps may be performed in parallel as well as sequentially. In alternative embodiments, certain of the logic operations may be performed in a different order, modified or removed and still implement preferred embodiments of the present invention. Morever, steps may be added to the above described logic and still conform to the preferred embodiments. Yet further steps may be performed by a single process or distributed processes.

While the server 108 and host 100 communicate within a client-server paradigm in the described implementations, they may also communicate within a peer-to-peer or any other paradigm known in the art. Furthermore, many of the software and hardware components have been described in separate modules for purposes of illustration. Such components may be integrated into a fewer number of components or divided into a larger number of components. Certain operations described as performed by a specific component may be performed by other components. Furthermore, one or more functions of the device independent firmware update utility 302 may be performed by a device dependent plug-in module 306 or vice versa.

Therefore, the foregoing description of the implementations has been presented for the purposes of illustration and description It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A data processing system for updating existing firmware installed on a plurality of different types of hardware devices in accordance with device specific constraints, the system comprising:

a device-independent firmware update application operating in the data processing system that receives, for a particular hardware device, a firmware update package containing a firmware image of new firmware program code and installation metadata including a header with dynamic constraints that relate to the data processing system and a version number, wherein the version number is read by the firmware update application to identify a version of the header and a name of a device dependent plug-in module;

a mechanism that uses the metadata to select and run the named device-dependent plug-in module that is specific to the particular hardware device, whereupon the named device-dependent plug-in module uses the metadata to examine the data processing system to determine whether device-specific constraints for installing the new firmware program code are met and wherein the named device dependent plug-in module is invoked by the firmware update application to interpret the dynamic constraints and to determine whether the dynamic constraints are satisfied before installing the firmware image on the particular hardware device; and an installation mechanism that cooperates with the device-dependent plug-in module and installs the firmware image on the hardware device when the device-specific constraints are met.

2. The computer system of claim 1, wherein the header further comprises: size and checksum information for the firmware image and elements of the metadata, wherein the firmware update application uses the size and checksum information to verify data integrity of the firmware image and the elements of the metadata; a number of parts information, wherein the firmware update application interprets the number of parts information to determine the number of parts of a multi-part file required for installing the firmware image; and a digital signature, wherein the firmware update application interprets the digital signature for authenticating the firmware update package.

3. The computer system of claim 1, wherein the dynamic constraints further comprise: a version number of a firmware upgrade, wherein the firmware update application interprets the version number to determine a version of the firmware upgrade corresponding to the installation on the particular hardware device of the firmware image; a minimum version number of an already installed firmware on the particular hardware device, wherein the installation mechanism installs the firmware image on the particular hardware device if the version number of the firmware upgrade is greater than the minimum version number of the already installed firmware; and a firmware update application version, wherein the firmware update application corresponding to the firmware update application version is capable of initiating an interpretation of the dynamic constraints.

4. The computer system of claim 1, wherein within the firmware update package the dynamic constraints are represented as a list of name value pairs that is interpreted by the device-dependent plug-in module to determine the dynamic constraints, wherein the firmware image is in a binary format, wherein multiple firmware images are stored in the firmware update package, and wherein the firmware image has multiple parts.

5. The computer system of claim 1, wherein the particular hardware device is coupled to the data processing system, and wherein the firmware update application initiates: an interpretation of the firmware update package on the data processing system; an extraction of the firmware image from the interpreted package; and an installation of the firmware image on the particular hardware device.

6. The computer system of claim 5, wherein: the firmware update package is installed on a first computational device; and the firmware update package is downloaded from the first computational device to the data processing system before the interpretation of the firmware update package on the data processing system.

7. The computer system of claim 5, wherein: the firmware update package is installed on a fixed media coupled to the data processing system; and the firmware update package is read from the fixed media to the data processing system before the reading and interpretation of the package on the data processing system.

8. The computer system of claim 1, wherein: the firmware image is included in a first data object in the; firmware update package and the metadata is included in at least one additional data object in the firmware update package.

9. The computer system of claim 1, wherein the firmware update package is created by using a firmware update package construction tool.

10. A method for updating existing firmware installed on a plurality of different types of hardware devices in accordance with device specific constraints, the method comprising:
(a) using a device-independent firmware update application operating in a data processing system to receive, for a particular hardware device, a firmware update package containing a firmware image of new firmware program code and installation metadata including a header and dynamic constraints that relate to the data processing system;
(b) reading, by the firmware update application, a version number of the header, wherein the version number identifies a version of the header;
(c) reading, by the firmware update application, a name and invoking, by the firmware update application, a device dependent plug-in module corresponding to the name;
(d) using the metadata to select and run the named device-dependent plug-in module that is specific to the particular hardware device whereupon the named device-dependent plug-in module uses the metadata to examine the data processing system to determine whether device-specific constraints for installing the new firmware program code are met and wherein the named device dependent plug-in module interprets the dynamic constraints to determine whether to install the firmware image;
(e) determining, with the device-dependent plug-in module, whether the dynamic constraints are satisfied before installing the firmware image on the particular hardware device; and
(f) installing the firmware image on the hardware device when the device-specific constraints are met.

11. The method of claim 10, further comprising: verifying, by the firmware update application date, integrity of the firmware image and the elements of the metadata by using a size and checksum information coupled to the header; interpreting, by the firmware update application, a number of parts information coupled to the header, to determine the number of parts of a multi-part file required for installing the firmware image; and interpreting, by the firmware update application, a digital signature coupled to the header, for authenticating the firmware update package.

12. The method of claim 10, further comprising: interpreting, by the firmware update application, a version number of a firmware upgrade coupled to the dynamic constraints, to determine a version of the firmware upgrade corresponding to the installation on the particular hardware device of the firmware image; installing, by the firmware update application, the firmware image on the particular hardware device if the version number of the firmware upgrade is greater than a minimum version number of the already installed firmware coupled to the dynamic constraints; and initiating an interpretation of the dynamic constraints, by the device-dependent plug-in module, wherein the firmware update application is of a version corresponding to a firmware update application version coupled to the dynamic constraints.

13. The method of claim 10, wherein within the firmware update package the dynamic constraints are represented as a list of name value pairs, and further comprising: interpreting the name value pairs by the device-dependent plug-in module to determine the dynamic constraints.

14. The method of claim 10, wherein the particular hardware device is coupled to the data processing system, the method further comprising: reading and interpreting the firmware update package on the data processing system; extracting the firmware image from the interpreted package; and installing of the firmware image on the particular hardware device.

15. The method of claim 14, further comprising: installing the firmware update package on a first computational device; and downloading the firmware update package from the first computational device to the data processing system before the reading and interpretation of the package on the data processing system.

16. The method of claim 14, further comprising: installing the firmware update package on a fixed media coupled to the data processing system; and downloading the firmware update package from the fixed media to the data processing system before the reading and interpretation of the firmware update package on the data processing system.

17. The method of claim 10, further comprising: including the firmware image in a first data object in the firmware update package; and including the metadata in at least one additional data object in the firmware update package.

18. The method of claim 10, further comprising: generating the firmware update package by using a firmware update package construction tool.

19. A system for updating existing firmware installed on a plurality of different types of hardware devices in accordance with device specific constraints, the system comprising:
means for using a device-independent firmware update application operating in a data processing system to receive, for a particular hardware device, a firmware update package containing a firmware image of new firmware program code and installation metadata including a header and dynamic constraints that relate to the data processing system;
means for reading, by the firmware update application, a version number of the header, wherein the version number identifies a version of the header, and a name;

means for using the metadata to select and run a device-dependent plug-in module that is specific to the particular hardware device whereupon the device-dependent plug-in module uses the metadata to examine the data processing system to determine whether device-specific constraints for installing the new firmware program code are met;

means for invoking, by the firmware update application, a device dependent plug-in module corresponding to the name, wherein the named device dependent plug-in module interprets the dynamic constraints to determine whether to install the firmware image;

means for determining, with the firmware update application, whether the dynamic constraints are satisfied before installing the firmware image on the particular hardware device; and means for installing the firmware image on the hardware device when the device-specific constraints are met.

20. The system of claim 19, further comprising: means for verifying, by the firmware update application date, integrity of the firmware image and the elements of the metadata by using a size and checksum information coupled to the header; means for interpreting, by the firmware update application, a number of parts information coupled to the header, to determine the number of parts of a multi-part file required for installing the firmware image; and means for interpreting, by the firmware update application, a digital signature coupled to the header, for authenticating the firmware update package.

21. The system of claim 19, further comprising: means for interpreting, by the firmware update application, a version number of a firmware upgrade coupled to the dynamic constraints, to determine a version of the firmware upgrade corresponding to the installation on the particular hardware device of the firmware image; means for installing, by the firmware update application, the firmware image on the particular hardware device if the version number of the firmware upgrade is greater than a minimum version number of the already installed firmware coupled to the dynamic constraints; and means for initiating an interpretation of the dynamic constraints, by the firmware update application, wherein the firmware update application is of a version corresponding to a firmware update application version coupled to the dynamic constraints.

22. The system of claim 19, wherein within the firmware update package the dynamic constraints are represented as a list of name value pairs, and further comprising: means for interpreting the name value pairs by the device-dependent plug-in module to determine the dynamic constraints.

23. The system of claim 19, wherein the particular hardware device is coupled to the data processing system, the system further comprising: means for reading and interpreting the package on the data processing system; extracting the firmware image from the interpreted package; and installing of the firmware image on the particular hardware device.

24. The system of claim 23, further comprising: means for installing the firmware update package on a first computational device; and means for downloading the firmware update package from the first computational device to the data processing system before the reading and interpretation of the firmware update package on the data processing system.

25. The system of claim 23, further comprising: means for installing the firmware update package on a fixed media coupled to the data processing system; and means for downloading the firmware update package from the fixed media to the data processing system before the reading and interpretation of the firmware update package on the data processing system.

26. The system of claim 19, further comprising: means for including the firmware image in a first data object in the firmware update package; and means for including the metadata in at least one additional data object in the firmware update package.

27. The system of claim 19, further comprising: means for generating the firmware update package by using a firmware update package construction tool.

* * * * *